US011863957B2

(12) United States Patent
Voishvillo

(10) Patent No.: US 11,863,957 B2
(45) Date of Patent: Jan. 2, 2024

(54) OMNIDIRECTIONAL LOUDSPEAKER AND COMPRESSION DRIVER THEREFOR

(71) Applicant: Harman International Industries, Incorporated, Stamford, CT (US)

(72) Inventor: Alexander Voishvillo, Simi Valley, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 17/883,950

(22) Filed: Aug. 9, 2022

(65) Prior Publication Data

US 2022/0386036 A1 Dec. 1, 2022

Related U.S. Application Data

(62) Division of application No. 17/072,194, filed on Oct. 16, 2020, now Pat. No. 11,445,303.

(51) Int. Cl.

*H04R 1/30* (2006.01)
*H04R 9/06* (2006.01)
*H04R 7/12* (2006.01)
*H04R 1/32* (2006.01)

(52) U.S. Cl.

CPC ............... *H04R 9/063* (2013.01); *H04R 1/30* (2013.01); *H04R 1/323* (2013.01); *H04R 7/127* (2013.01); *H04R 9/06* (2013.01); *H04R 2201/34* (2013.01); *H04R 2400/13* (2013.01)

(58) Field of Classification Search

CPC ........ H04R 1/30; H04R 1/323; H04R 1/2861; H04R 1/2865

See application file for complete search history.

(56) References Cited

U.S. PATENT DOCUMENTS 4,134,471 A 1/1979 Queen
4,496,021 A 1/1985 Berlant
4,776,428 A 10/1988 Belisle
4,908,601 A 3/1990 Howze
(Continued)

FOREIGN PATENT DOCUMENTS

GB 2211377 A 6/1989
WO 03084288 A1 10/2003

*Primary Examiner* — Suhan Ni
(74) *Attorney, Agent, or Firm* — Brooks Kushman P.C.

(57) ABSTRACT

A compression driver for an omnidirectional loudspeaker includes a motor assembly and a dome diaphragm disposed coaxially above and operably connected to the motor assembly, the diaphragm having a convex surface and a concave surface. The compression driver includes a phasing plug having a top portion and a bottom portion having a concave bottom surface disposed adjacent the convex surface of the diaphragm and defining a compression chamber therebetween. The phasing plug includes a plurality of conduits extending through the bottom portion for sound waves to travel and converging to form an annular exit, the top portion including a plurality of radially expanding channels acoustically connected to the annular exit. Actuation of the diaphragm by the motor assembly generates sound waves within the compression chamber which travel through the annular exit and the radially-expanding channels to create a generally horizontal 360° radiation pattern of the sound waves from the compression driver.

18 Claims, 5 Drawing Sheets

(56) References Cited

U.S. PATENT DOCUMENTS

| | | | | |
|---|---|---|---|---|
| 4,975,965 | A | 12/1990 | Adamson | |
| 5,117,462 | A | 5/1992 | Bie | |
| 5,163,167 | A | 11/1992 | Heil | |
| 5,359,158 | A | 10/1994 | Queen | |
| 7,650,006 | B2 | 1/2010 | Isotalo | |
| 7,725,599 | B2 | 6/2010 | Kubota | |
| 10,038,954 | B2 | 7/2018 | Voishvillo | |
| 2003/0215107 | A1 | 11/2003 | Werner | |
| 2008/0264717 | A1 | 10/2008 | Onishi | |
| 2010/0329495 | A1 | 12/2010 | Wendell et al. | |
| 2012/0027238 | A1 | 2/2012 | Voishillo | |
| 2013/0228393 | A1 | 9/2013 | Sterling et al. | |
| 2014/0185854 | A1* | 7/2014 | Murphy | H04R 1/30<br>381/343 |
| 2016/0212523 | A1 | 7/2016 | Spillmann et al. | |
| 2016/0309257 | A1 | 10/2016 | Liu et al. | |
| 2017/0064421 | A1* | 3/2017 | Matsumura | H04R 1/2896 |
| 2018/0054671 | A1 | 2/2018 | Voishvillo | |
| 2018/0063636 | A1 | 3/2018 | Spillmann et al. | |
| 2019/0174224 | A1 | 6/2019 | Chen | |
| 2019/0222925 | A1 | 7/2019 | Ha et al. | |
| 2020/0137481 | A1 | 4/2020 | Casadei et al. | |

* cited by examiner

OMNIDIRECTIONAL LOUDSPEAKER AND COMPRESSION DRIVER THEREFOR

CROSS-REFERENCE TO RELATED APPLICATIONS

This application is a division of U.S. application Ser. No. 17/072,194 filed Oct. 16, 2020, now U.S. Pat. No. 11,445, 303, the disclosure of which is hereby incorporated in its entirety by reference herein.

TECHNICAL FIELD

Embodiments relate to an omnidirectional loudspeaker and a compression driver with a dome diaphragm for use in an omnidirectional loudspeaker.

BACKGROUND

An ideal omnidirectional speaker radiates sound similarly in all directions and, from an acoustical standpoint, behaves like a pulsating sphere. Typically, in practical applications, the omnidirectionality is provided in a horizontal plane. Omnidirectional transducers and loudspeaker systems incorporating them are used for various applications such as Hi-Fi loudspeakers, alarm systems, landscape loudspeaker systems, and portable audio Bluetooth-based loudspeakers.

Typical omnidirectional speaker systems include direct-radiating transducers having conical or dome diaphragms with corresponding "diffusers" which spread sound waves in an omnidirectional manner. The transducers are oriented in such a way that the diaphragm axis is oriented vertically, such that the sound radiation is converted to distribution in a horizontal plane. Unfortunately, direct-radiating transducers have a low efficiency, maximally a few percent. This limits the efficiency, sensitivity, and maximum sound pressure level of transducers and loudspeaker systems providing omnidirectional radiation. Furthermore, prior horn systems used for omnidirectional purposes typically include arrays of directional horns, and these systems have regions of cancellation between individual horns that result in non-uniform coverage patterns and degraded performance.

SUMMARY

In one or more embodiments, a compression driver for an omnidirectional loudspeaker includes a motor assembly and a dome diaphragm disposed coaxially above and operably connected to the motor assembly, the diaphragm having a convex surface and a concave surface. The compression driver further comprises a phasing plug having a bottom portion and a top portion, the bottom portion having a concave bottom surface disposed adjacent the convex surface of the diaphragm and defining a compression chamber therebetween. The phasing plug includes a plurality of conduits extending through the bottom portion for sound waves to travel, the plurality of conduits converging to form an annular exit, the top portion including a plurality of radially expanding channels acoustically connected to the annular exit. Actuation of the diaphragm by the motor assembly generates sound waves within the compression chamber which travel through the annular exit and the radially-expanding channels to create a generally horizontal 360° radiation pattern of the sound waves from the compression driver.

In one or more embodiments, an omnidirectional loudspeaker includes a lower horn member having a generally convex, upwardly-facing outer wall and an upper horn member spaced from the lower horn member and having a generally convex, downwardly-facing outer wall. At least one compression driver is connected to one of the lower or the upper horn members along a central axis and including a motor assembly, a dome diaphragm operably connected to the motor assembly and having a convex surface and a concave surface, a phasing plug having a bottom portion and a top portion, the bottom portion having a concave bottom surface adjacent the convex surface of the diaphragm and defining a compression chamber therebetween. The lower and the upper horn members are coupled via the at least one compression driver in spaced relationship along the central axis to define a passageway for radiating sound waves generated by the at least one compression driver in a generally horizontal 360° radiation pattern.

In one or more embodiments, an omnidirectional loudspeaker includes a lower horn member having a generally convex, upwardly-facing outer wall and an upper horn member spaced from the lower horn member and having a generally convex, downwardly-facing outer wall. A compression driver connected to one of the lower or the upper horn members along a central axis and includes a motor assembly, a dome diaphragm operably connected to the motor assembly and having a convex surface and a concave surface, and a phasing plug having a bottom portion and a top portion. The bottom portion has a concave bottom surface adjacent the convex surface of the diaphragm, defining a compression chamber therebetween. The phasing plug includes a plurality of conduits extending through the bottom portion for sound waves to travel, the plurality of conduits converging to form an annular exit, the top portion including a plurality of radially expanding channels acoustically connected to the annular exit. Actuation of the diaphragm by the motor assembly generates sound waves within the compression chamber which travel through the annular exit and the radially-expanding channels. The lower and the upper horn members are coupled via the compression driver in spaced relationship along the central axis to define a passageway for radiating sound waves generated by the compression driver in a generally horizontal 360° radiation pattern.

DETAILED DESCRIPTION

Figure 1:
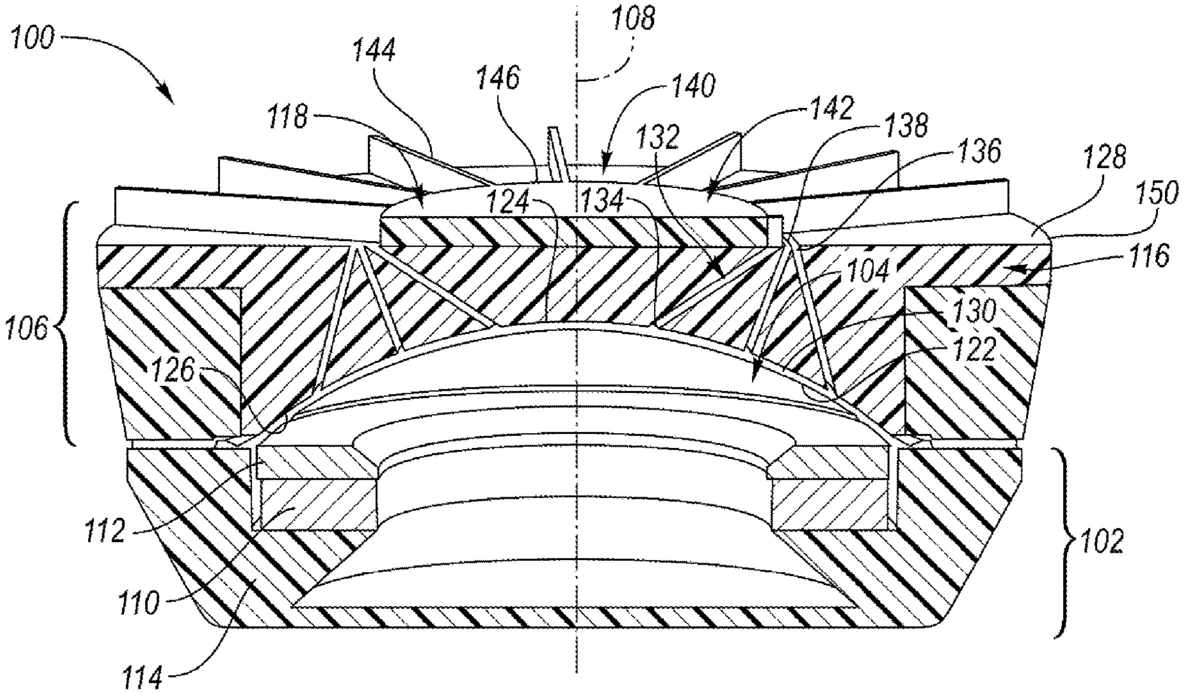
FIG. 1 is a cross-sectional view of a compression driver for use in an omnidirectional loudspeaker according to one or more embodiments.
Figure 2:
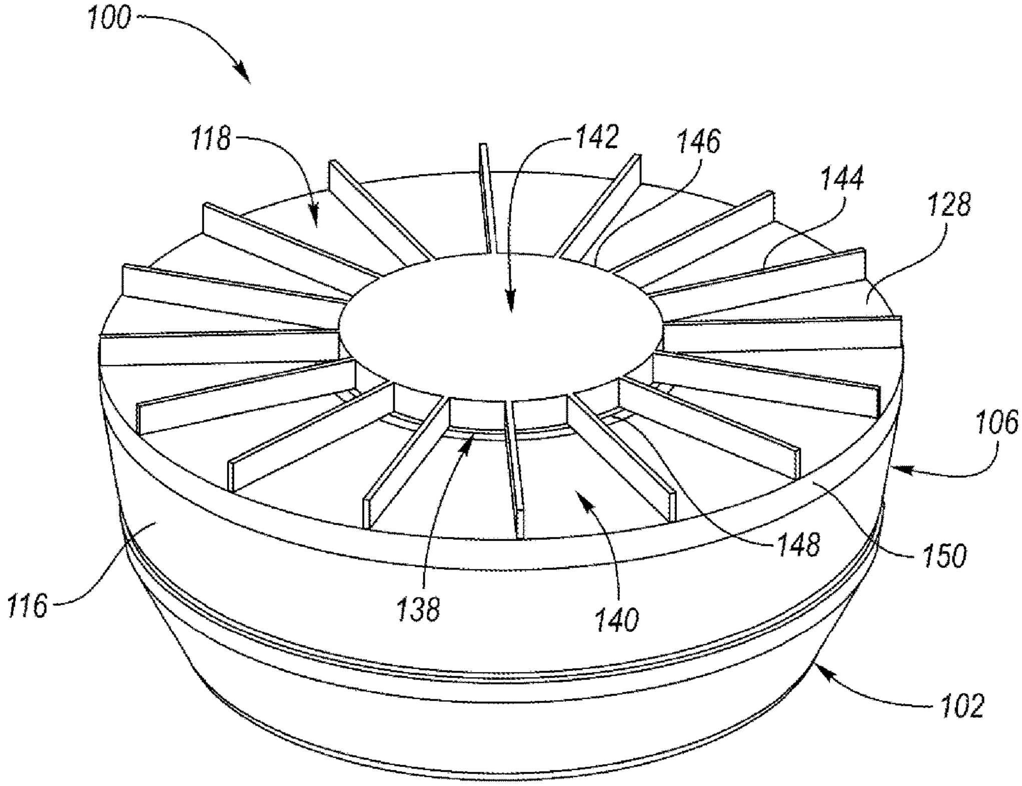
FIG. 2 is a perspective view of the compression driver of FIG. 1.
Figure 3:
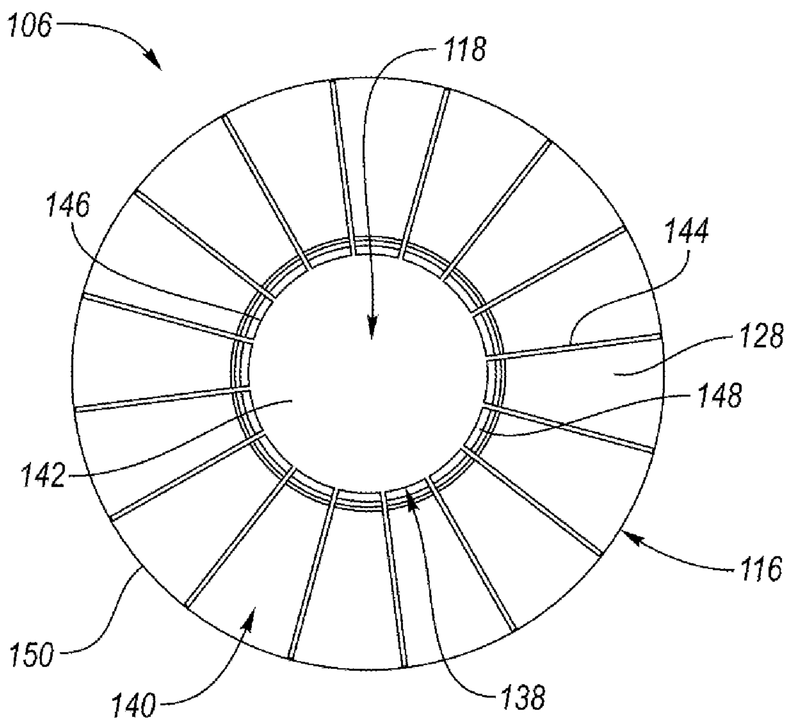
FIG. 3 is a top view of a phasing plug of the compression driver according to one or more embodiments.
Figure 4:
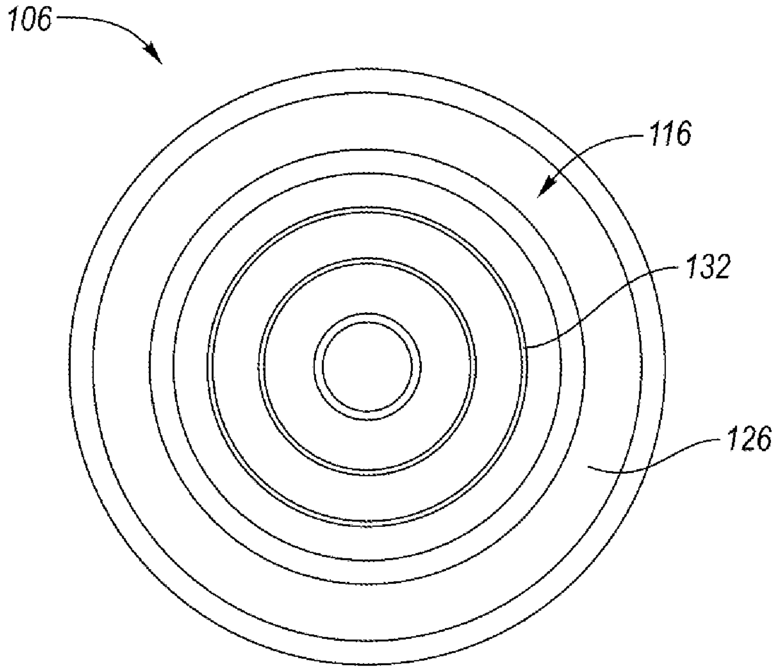
FIG. 4 is a bottom view of the phasing plug of FIG. 3.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Existing omnidirectional loudspeakers are typically based on direct radiating transducers. In one or more embodiments, an omnidirectional loudspeaker is disclosed herein which utilizes a compression driver for efficiently and effectively generating sound in a generally horizontal 360° radiation pattern. In particular, embodiments disclosed herein are based on a compression driver having a dome diaphragm, wherein the disclosed compression driver has a significantly higher efficiency compared with direct radiating transducers.

There is a difference between compression drivers based on annular diaphragms and dome diaphragms. Annular diaphragms are typically thermoformed from polymer films whereas dome diaphragms are typically made of stamped aluminum, magnesium, titanium, or beryllium foil. Therefore, the internal damping is higher in annular diaphragms. Due to the lower density of polymer film, the moving mass of annular diaphragms is lower for the same diameter of the voice coil. Also, for the same diameter of the voice coil, dome diaphragms typically have a larger effective area. Mechanical compliance of an annular diaphragm is higher than that of a dome diaphragm. In other words, dome diaphragms are generally stiff and heavy whereas annular diaphragms are generally soft and light. In general, for the same diameter voice coil, compression drivers using a dome diaphragm are a better choice for two-way loudspeaker systems because they have lower fundamental resonance compared to drivers based on drivers having an annular flexural diaphragm.

However, existing dome diaphragm-based compression drivers typically have multiple concentric inputs to a phasing plug that merge into a circular exit of the driver. This configuration prevents the phasing plug from having radial exits. Embodiments disclosed herein include a compression driver constructed with a dome diaphragm and an annular exit which directs sound waves radially for use in omnidirectional loudspeakers.

With reference first to FIGS. 1-6, a compression driver 100 is illustrated which includes a motor assembly 102, a dome diaphragm 104 disposed above and operably connected to the motor assembly 102, and a phasing plug 106 disposed above the diaphragm 104 coaxially along a central axis 108. In one or more embodiments, the motor assembly 102 may comprise an annular permanent magnet 110 disposed between an annular top plate 112 and a back plate 114, although the motor assembly 102 is not limited to this construction. As is known in the art, the motor assembly 102 provides a permanent magnetic field for electrodynamic coupling with a voice coil (not shown), wherein the voice coil is mechanically coupled to the diaphragm 104 and produces movement of the flexible portion of the diaphragm 104 to convert received electrical signals into sound waves which are propagated from the compression driver 100.

Figure 5:
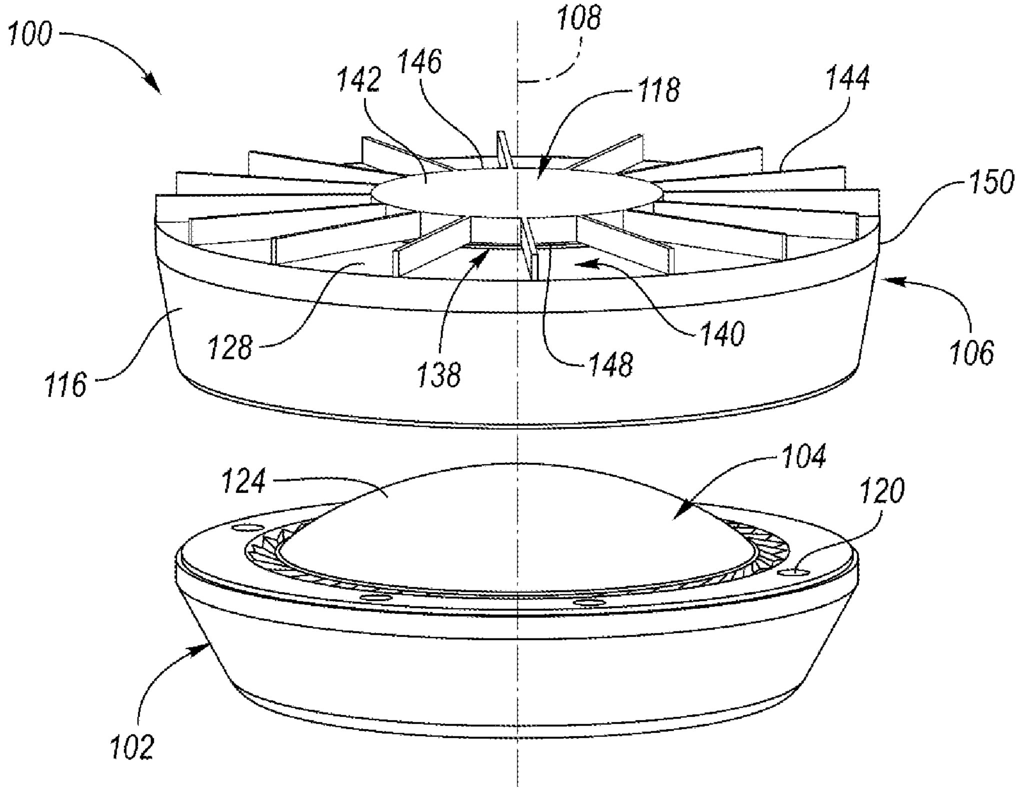
FIG. 5 is a perspective, exploded view of the compression driver according to one or more embodiments.
Figure 6:
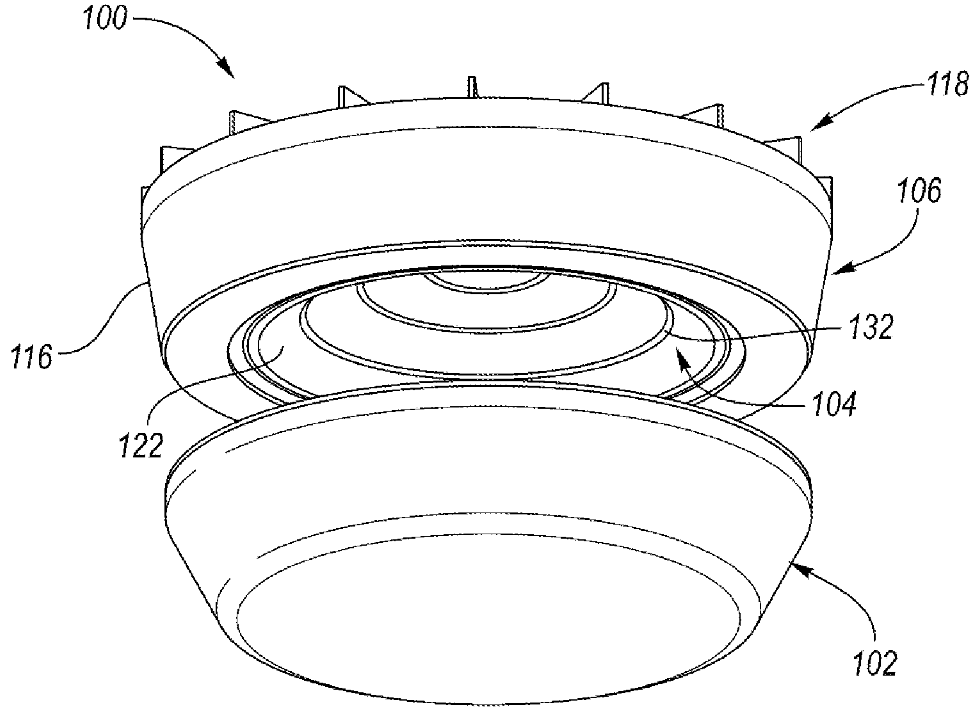
FIG. 6 is a bottom perspective, exploded view of the compression driver of FIG. 5.

The phasing plug 106 includes a bottom portion 116 and a top portion 118 disposed generally symmetrically about the central axis 108. The top portion 118 may have a generally constant height above the bottom portion 116, and the top portion 118 may be integrally formed with the bottom portion 116 or may be attached to the bottom portion 116 by any suitable means. The bottom portion 116 may be generally circular or may have any other suitable geometry. The bottom portion 116 may be coupled or mounted to the back plate 114 of the motor assembly 102. The motor assembly 102, the diaphragm 104, and the phasing plug 106 may be connected together, for example, by fasteners through mounting apertures 120 (FIG. 5).

The dome diaphragm 104 has a lower, concave surface 122 and an upper, convex surface 124. Contrary to typical compression drivers with dome diaphragms where the acoustic signal is directed by the phasing plug adjacent the concave surface of the dome, in one or more embodiments disclosed herein the acoustic signal may enter the phasing plug 106 from the convex surface 124 of the dome diaphragm 104. This configuration advantageously increases the overall effective area of the diaphragm 104 without increasing the moving mass, as the surround may function as a radiation area as well. The bottom portion 116 of the phasing plug 106 includes a bottom surface 126 facing the convex surface 124 of the diaphragm 104 and an opposing top surface 128. The bottom surface 126 may be generally concave, complementary to the convex surface 124 of the diaphragm 104, whereas the top surface 128 may be generally planar. It is understood that any directional terms as used herein are merely to indicate the relative placement of various components of the compression driver 100 and are not intended to be limiting.

In a compression driver, the diaphragm 104 is loaded by a compression chamber, which is a thin layer of air separating the diaphragm 104 from the phasing plug 106. In one or more embodiments, a compression chamber 130 is defined in a space between the convex surface 124 of the diaphragm 104 and the concave bottom surface 126 of the phasing plug bottom portion 116. The volume of air entrapped in the compression chamber 130 is characterized by an acoustical compliance which is proportional to the volume of compression chamber 130. In practice, the height of the compression chamber 130 may be quite small (e.g., approximately 0.5 mm or less) such that the volume of the compression chamber 130 is also small. According to the present disclosure, the area above the surround also becomes part of the compression chamber 130. With this wider compression chamber 130, resonances within the compression chamber 130 will shift to lower frequencies and the position of their nodes (zeros of pressure) will change position as well.

As shown in FIGS. 1-6, the bottom portion 116 of the phasing plug 106 further includes at least one conduit 132 that extends as a passage through the bottom portion 116 from the bottom surface 126 to the top surface 128 through which sound waves created by the diaphragm 104 may travel. As depicted herein, a plurality of conduits 132 may be provided as concentric annular passages arranged circumferentially about the central axis 108, forming concentric circles adjacent the convex surface 124 of the diaphragm 104. The conduits 132 may be positioned at concentric radii selected to provide suppression of resonances (e.g., the first three resonances) in the compression chamber 130. In one or more embodiments, the conduits 132 may be positioned in the nodes of the highest resonance mode to be suppressed, whereas the rest of the resonance modes may be suppressed by setting different areas or widths of the conduits 132. Since the surround becomes part of the compression chamber 130, the conduits 132 may be shifted toward a periphery of the bottom portion 116 of the phasing plug 106.

The actuation of the diaphragm 104 generates high sound pressure acoustical signals within the compression chamber 130, and the signals travel as sound waves through the bottom portion 116 of the phasing plug 106 via the conduits 132. The conduits 132 serve to carry sound waves from all areas of the convex surface 124 of the diaphragm 104 through the phasing plug bottom portion 116. The conduits 132 each have a first end 134 adjacent the convex surface 124 of the diaphragm 104 and in communication with the compression chamber 130, and a second end 136 at the top surface 128 of the bottom portion 116. The conduits 132 may each have substantially similar lengths from their first ends 134 to their second ends 136, where the second ends 136 of the conduits 132 all converge to form an annular exit 138 to the compression driver 100, such that each pulse of sound exits the phasing plug bottom portion 116 as one coherent wavefront. Substantially similar lengths of the conduits 132 may eliminate interference at high frequencies cause by different propagation times of a signal from the compression chamber 130 through the conduits 132. In one or more embodiments, the conduits 132 may have different shapes in order to have substantially similar lengths from their first ends 134 to their second ends 136. For example, the central conduit 132 in FIG. 1 could alternatively have a curved shape in order for its length to be substantially similar to the length of the conduits 132 on either side thereof. It is understood that while three conduits 132 are shown herein, a greater or fewer number of conduits 132 is also fully contemplated.

In one or more embodiments, the top portion 118 of the phasing plug 106 includes a plurality of radially expanding channels 140 acoustically connected to the annular exit 138. As shown in FIGS. 1-3 and 5, the top portion 118 may have a central section 142 and a plurality of arms 144 extending outwardly therefrom, wherein a pair of adjacent arms 144 defines one of the plurality of radially-expanding channels 140 therebetween. An outer edge 146 of the central section 142 may be disposed inboard of the annular exit 138, defining an aperture 148 between each pair of adjacent arms 144. In a top view, each arm 144 may have a thin-walled configuration with a generally constant width, wherein this thin-walled separation between the channels 140 may ensure there is no constriction or narrowing as the signal leaves the compression chamber 130. Of course, it is understood that the phasing plug 106 is not limited to the embodiments depicted herein, and that the bottom portion 116 and top portion 118 may include other suitable shapes and configurations.

The annular exit 138 therefore merges into and is acoustically connected to a corresponding radially expanding channel 140 defined between each pair of adjacent arms 144 and the bottom portion 116 of the phasing plug 106. The channels 140 have expanding width and merge at the perimeter 150 of the bottom portion 116, and thus of the compression driver 100. Actuation of the diaphragm 104 by the motor assembly 102 generates sound waves within the compression chamber 130 which travel through the annular exit 138 and the radially expanding channels 140 to create a generally horizontal 360° radiation pattern of the sound waves from the compression driver 100. The channels 140 may function to ensure even distribution of sound pressure around the entirety of the compression driver 100 for achieving omnidirectional radiation of sound. In addition to the embodiments depicted herein, it is also contemplated that the phasing plug 106 could include a lesser or greater number of channels 140.

Figure 7:
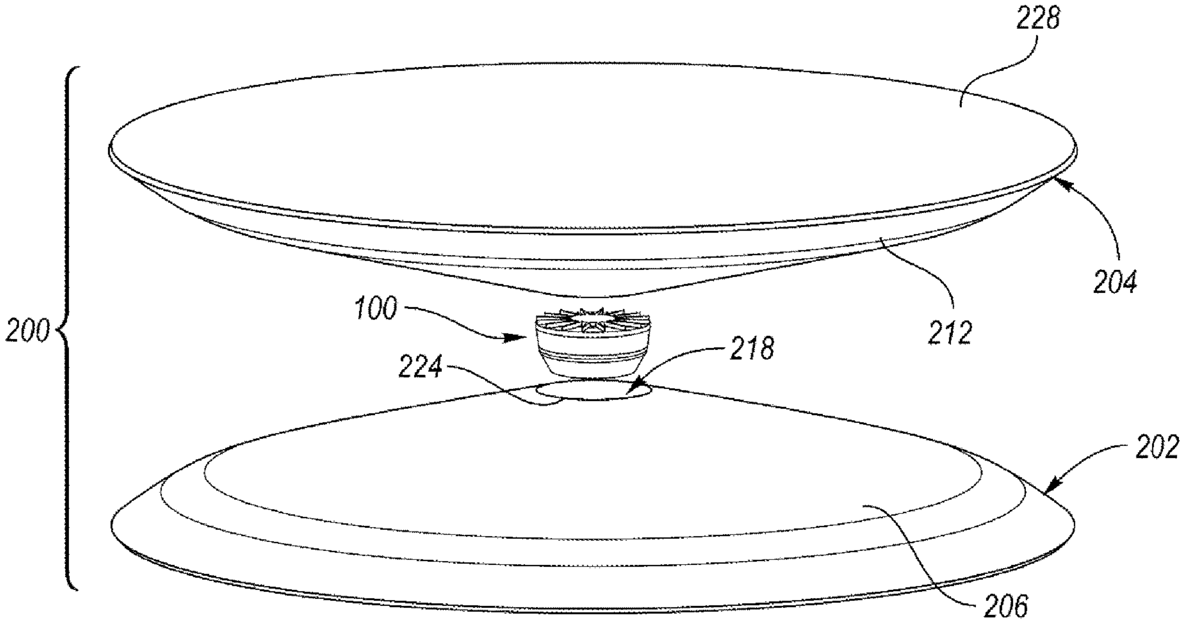
FIG. 7 is an exploded view of an omnidirectional loudspeaker according to one including a compression driver and lower and upper horn members.

FIG. 7 is an exploded view of an omnidirectional loudspeaker 200 according to one or more embodiments including the compression driver 100 and an exponential horn which includes a first or lower horn member 202 and a second or upper horn member 204. The lower horn member 202 may be generally bowl-shaped with a generally convex, upwardly-facing outer wall 206 and a generally concave, downwardly-facing inner wall 208 defining a lower cavity 210. Correspondingly, the upper horn member 204 may be generally bowl-shaped with a generally convex, downwardly-facing outer wall 212 and a generally concave, upwardly-facing inner wall 214 defining an upper cavity 216. Both the upper and lower horn members 202, 204 may be rotationally symmetric about the central axis 108.

At least one of the lower and upper horn members 202, 204 includes a recess 218 which may be generally cylindrical and sized to at least partially receive the compression driver 100. The recess 218 may be defined by a generally planar floor member 220 and an upstanding wall structure 222 connected to and at least partially surrounding the floor member 220, where the recess 218 includes an opening 224 adjacent the outer wall 206, 212 of the corresponding horn member 202, 204. The compression driver 100 may be disposed or mounted within the recess 218, such as by one or more fasteners engaging the floor member 220, for generating sound energy.

Figure 8:
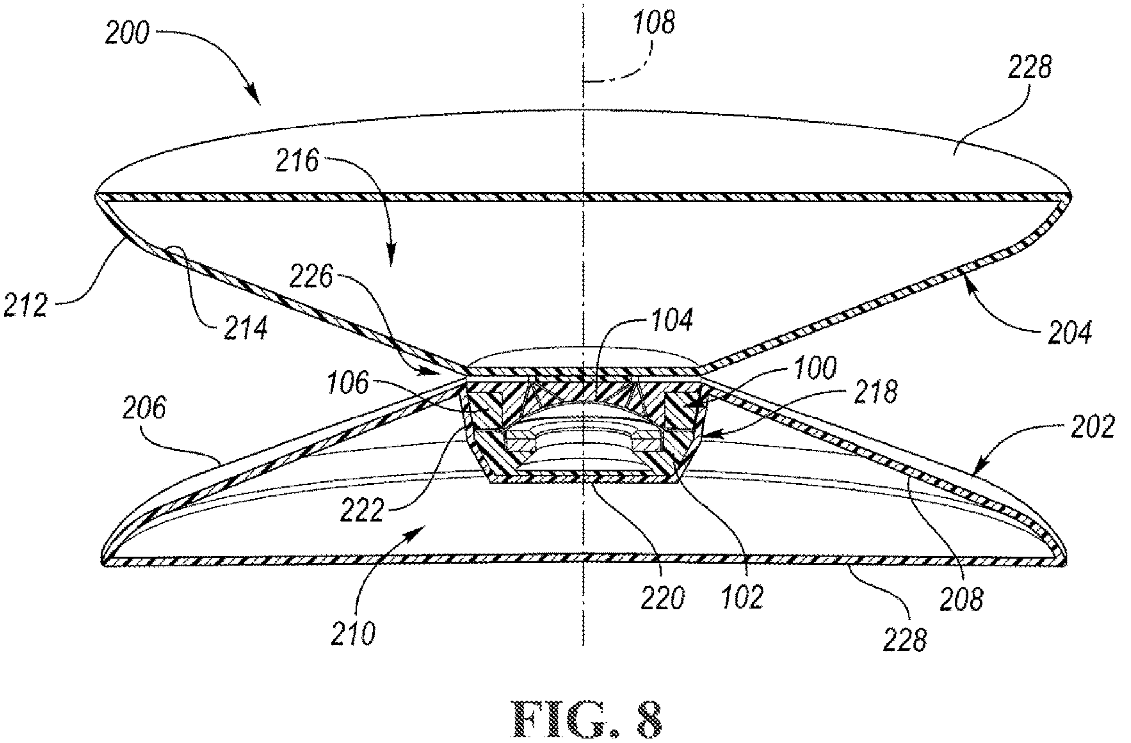
FIG. 8 is a cross-sectional view of an assembled omnidirectional loudspeaker according to one or more embodiments.

FIG. 8 is a cross-sectional view of the assembled omnidirectional loudspeaker 200 including the compression driver 100 and the lower and upper horn members 202, 204. In this instance where the compression driver 100 is received in the lower horn member 202, the upper horn member 204 is mounted on and secured to the compression driver 100 by fasteners, such as mounting screws. Of course, if the compression driver 100 is received in the upper horn member 204, then the lower horn member 202 may be secured to the compression driver 100. When assembled, the compression driver 100 is generally centrally located within the omnidirectional loudspeaker 200, and the lower and upper horn members 202, 204 may be spaced apart, such as by a height of the top portion 118 of the phasing plug 106. The sound waves generated by the diaphragm 104 propagate through the conduits 132 into an annular waveguide that expands in the radial direction, the waveguide formed by the radially-expanding air channels 140 of the top portion 118 of the phasing plug 106 and the outer walls 206, 212 of the lower and upper horn members 202, 204.

With reference to FIG. 1, the compression chamber 130 is located in the space between the diaphragm 104 and the bottom surface 126 of the phasing plug bottom portion 116. In practice, the height of the compression chamber 130 may be quite small (e.g., approximately 0.5 mm or less) such that the volume of the compression chamber 130 is also small. The actuation of the diaphragm 104 generates high sound-pressure acoustical signals within the compression chamber 130, and the signals travel as sound waves through the bottom portion 116 of the phasing plug 106 via the conduits 132 that provide passages from the bottom surface 126 to the top surface 128. With the conduits 132, the area of the entrance to the phasing plug 106 is significantly smaller than the area of the diaphragm 104. The air paths of the phasing plug 106 are essentially the beginning of the horn which functions to control directivity (i.e., coverage of sound pressure over a particular listening area) and to increase reproduced sound pressure level over a certain frequency range. The overall acoustical cross-sectional area of the air paths, including the conduits 132 and outwardly radiating channels 140, in the phasing plug 106 and then of the horn members 202, 204 gradually increase to provide a smooth transition of sound waves. From the conduits 132 and apertures 148, the sound waves radiate outward along the radially expanding channels 140, through a passageway 226 between the compression driver 100 and the horn members 202, 204, and propagate omnidirectionally into the ambient environment.

The lower horn member 202 limits the propagation of sound energy in a first axial direction (i.e., downwardly), and the upper horn member 204 limits the propagation of sound energy in a second axial direction (i.e., upwardly). The lower and upper horn members 202, 204 thus provide acoustical loading for the compression driver 100 and control of the directivity in the vertical plane. The lower and upper horn members 202, 204 are coupled via the compression driver 100 in spaced relationship along the central axis 108 such that, in combination, the lower and upper horn members 202, 204 define a passageway 226 therebetween to direct the flow of sound energy radially. As such, the lower and upper horn members 202, 204 may function like a radial horn, providing omnidirectional coverage extending 360° about the central axis 108 to direct the flow of sound energy generated by the compression driver 100 to radiate 360° outwardly horizontally in all directions.

Of course, it is understood that directional identifiers such as upper and lower and upwardly and downwardly used herein are not intended to be limiting and are simply used to provide an exemplary environment for the components of the omnidirectional loudspeaker 200 as disclosed herein.

Figure 9:
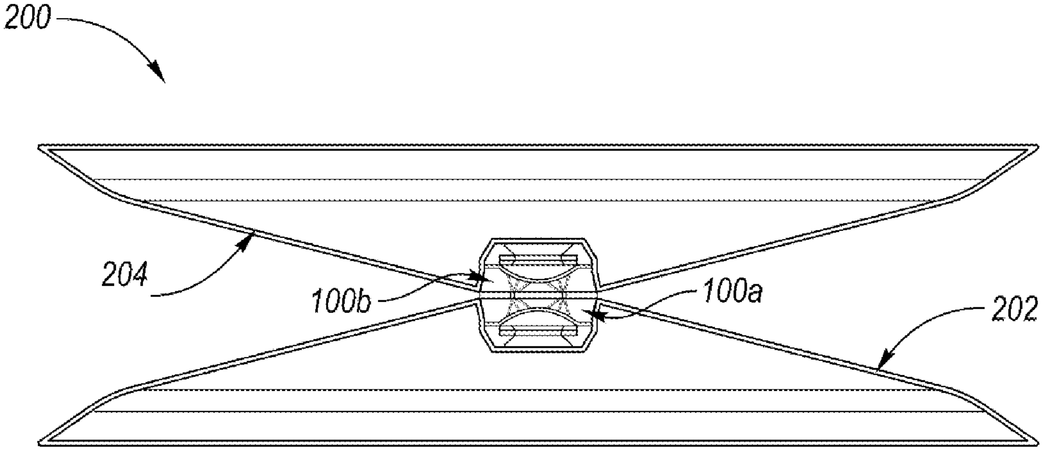
FIG. 9 is a cross-sectional view of an omnidirectional loudspeaker having dual compression drivers.

FIG. 9 is a cross-sectional view of an embodiment of the omnidirectional loudspeaker 200 which includes dual compression drivers 100. As shown, a first compression driver 100*a* is disposed within the lower horn member 202 and a second compression driver 100*b* is disposed within the upper horn member 204 in an opposed axial orientation, where the first and second compression drivers 100*a*, 100*b* may be secured to each other. As such, the first compression driver 100*a* generates sound in a first axial direction and the second compression driver 100*b* generates sound in a second or opposite axial direction. The compression drivers 100*a*, 100*b* are vertically arranged in a very compact space in opposing recesses 218 and their output is blended, where the drivers 100*a*, 100*b* can be secured directly to one another or both joined to an intermediate plate (not shown). This configuration further increases the sound pressure output and maximum sound pressure level of the omnidirectional loudspeaker 200, where the compression drivers 100*a*, 100*b* are vertically arranged in a very compact space in opposing recesses 218.

In another embodiment, compression drivers 100*a*, 100*b* of different sizes and frequency ranges may be utilized. For example, a high frequency driver 100*a* may disposed within the lower horn member 202 and a midrange driver 100*b* may disposed within the upper horn member 204, although the omnidirectional loudspeaker 200 is not limited to this type and placement of drivers 100*a*, 100*b*. In such a configuration, two compression drivers 100*a*, 100*b* having different-sized voice coils and diaphragms can be coupled such that a summation of the signals is provided at the exits of the phasing plugs 106, and the outputs of both drivers 100*a*, 100*b* pass through the passageway 226 formed between the horn members 202, 204 and are then uniformly radiated in the horizontal plane for uniform sound distribution in a 360° pattern. As such, the omnidirectional loudspeaker 200 functions as a two-way system, and therefore its frequency range is expanded.

Figure 10:
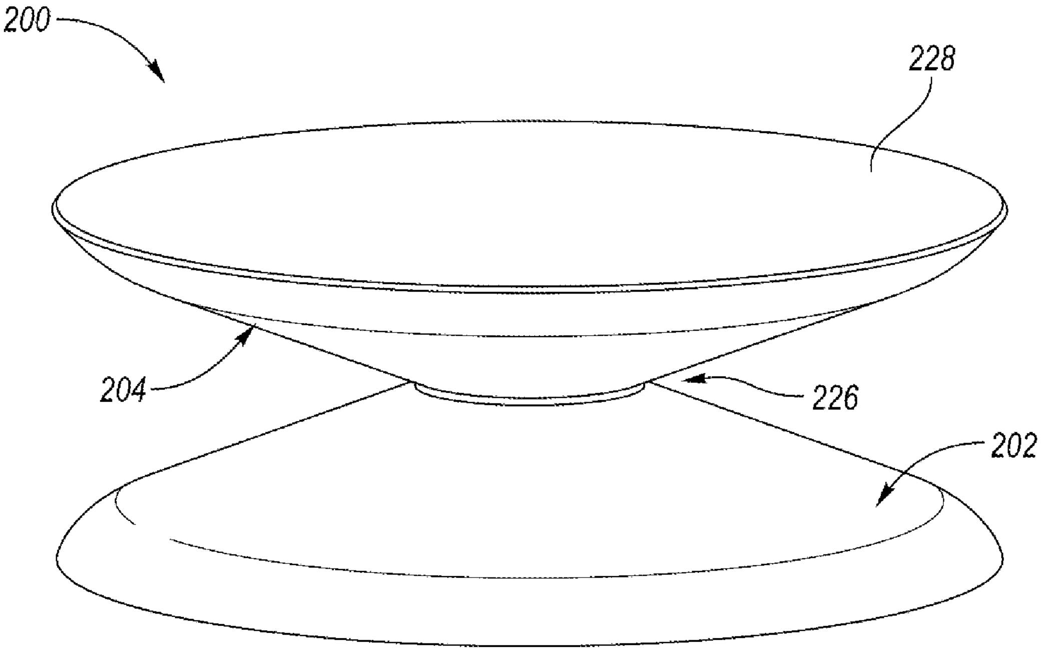
FIG. 10 is a perspective view of an assembled omnidirectional loudspeaker according to one or more embodiments.

FIG. 10 depicts an omnidirectional loudspeaker 200 with covers 228 enclosing the lower and upper horn members 202, 204. Each omnidirectional loudspeaker 200 is suitable as a stand-alone acoustical unit but, if a system of higher sound pressure level output is desired, a plurality of omnidirectional loudspeakers 200 may be assembled or vertically stacked in modular fashion, one above the other, to form an omnidirectional speaker array. The modularity of the omnidirectional loudspeaker 200 disclosed herein advantageously allows for the construction of loudspeaker systems having a wide range of potential intensities by assembling an appropriate number of loudspeaker units 200, each having the same size, engagement and mounting surfaces, and fastening structures.

FIGS. 7-10 show a constant directivity (in the vertical plane) axisymmetric horn 202, 204 which has a conical expansion at the beginning and a wider opening at the end to compensate for a "waist banding effect" which is a narrowing of the directivity response of conical horns in their midrange frequency band. In particular, this effect is compensated for by the opening of the flare angle of the horn 202, 204 in a beginning portion or mouth of the passageway 226. In alternative embodiments, the horn 202, 204 could, for example, have an exponential profile or other profiles, or could not be symmetric in the vertical plane and instead oriented at angle "looking down and outside", which may be more optimal for a ceiling speaker.

Applications for the compression driver 100 and omnidirectional loudspeaker 200 described herein include, but are not limited to, landscape sound systems, Hi-Fi systems, home lifestyle loudspeaker systems, public address systems, alarm and warning sound systems, portable audio Bluetooth-based loudspeakers, high-powered pendant speakers, negative directivity ceiling speakers, or other applications where omnidirectionality is desired or required. Compared with direct-radiating dome speakers, use of the compression driver 100 in the omnidirectional loudspeaker 200 disclosed herein advantageously results in an increase in efficiency. The compression driver 100 and omnidirectional loudspeaker 200 provide uniform sound radiation at all frequencies over a full 360° coverage area, are easily scalable for different sizes of voice coils and diaphragms, and may provide a modular system for the construction of customized speaker arrays.

In the embodiments disclosed herein, using a dome diaphragm provides an effective area greater than that of an annular diaphragm, increasing the maximum SPL output of the compression driver. In addition, the dome diaphragm has a comparatively low resonance frequency, and the combination of these properties makes the transducer well suited for two-way line arrays. Still further, the smaller cross-sectional dimensions of the acoustical paths, compared to a driver with a circular exit, improves directivity control at high frequencies.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. An omnidirectional loudspeaker, comprising:

a lower horn member having a generally convex, upwardly-facing outer wall;

an upper horn member spaced from the lower horn member and having a generally convex, downwardly-facing outer wall; and at least one compression driver connected to one of the lower or the upper horn members along a central axis and including a motor assembly, a dome diaphragm operably connected to the motor assembly and having a convex surface and a concave surface, a phasing plug having a bottom portion and a top portion, the bottom portion having a concave bottom surface adjacent the convex surface of the diaphragm and defining a compression chamber therebetween, wherein the lower and the upper horn members are coupled via the at least one compression driver in spaced relationship along the central axis to define a passageway for radiating sound waves generated by the at least one compression driver in a generally horizontal 360° radiation pattern.

2. The omnidirectional loudspeaker of claim 1, wherein the phasing plug includes a plurality of conduits extending through the bottom portion for sound waves to travel, the plurality of conduits converging to form an annular exit.

3. The omnidirectional loudspeaker of claim 2, wherein the plurality of conduits include concentric annular passages.

4. The omnidirectional loudspeaker of claim 2, wherein the plurality of conduits each have substantially similar lengths from a first end to a second end thereof.

5. The omnidirectional loudspeaker of claim 2, wherein the top portion includes a plurality of radially-expanding channels acoustically connected to the annular exit, wherein actuation of the diaphragm by the motor assembly generates sound waves within the compression chamber which travel through the annular exit and the radially-expanding channels.

6. The omnidirectional loudspeaker of claim 5, wherein the top portion has a central section and a plurality of arms extending outwardly therefrom, wherein a pair of adjacent arms defines one of the plurality of radially-expanding channels therebetween.

7. The omnidirectional loudspeaker of claim 6, wherein an outer edge of the central section is disposed inboard of the annular exit, defining an aperture between each pair of adjacent arms.

8. The omnidirectional loudspeaker of claim 7, wherein each arm has a generally constant width.

9. The omnidirectional loudspeaker of claim 5, wherein the radially-expanding channels have an expanding width in a horizontal plane from the annular exit to a perimeter of the compression driver.

10. The omnidirectional loudspeaker of claim 1, wherein the top portion has a generally constant height above the bottom portion.

11. The omnidirectional loudspeaker of claim 1, wherein at least one of the lower or the upper horn members includes a recess for at least partially receiving the at least one compression driver.

12. The omnidirectional loudspeaker of claim 1, wherein the lower horn member includes generally concave, downwardly-facing inner wall defining a lower cavity, and wherein the upper horn member includes a generally concave, upwardly-facing inner wall defining an upper cavity.

13. The omnidirectional loudspeaker of claim 1, wherein the at least one compression driver includes a first compression driver disposed in the lower horn member and a second compression driver disposed in the upper horn member in opposed axial orientations.

14. An omnidirectional loudspeaker, comprising:

a lower horn member having a generally convex, upwardly-facing outer wall;

an upper horn member spaced from the lower horn member and having a generally convex, downwardly-facing outer wall; and a compression driver connected to one of the lower or the upper horn members along a central axis and including a motor assembly, a dome diaphragm operably connected to the motor assembly and having a convex surface and a concave surface, and a phasing plug having a bottom portion and a top portion, the bottom portion having a concave bottom surface adjacent the convex surface of the diaphragm and defining a compression chamber therebetween, the phasing plug includes a plurality of conduits extending through the bottom portion for sound waves to travel, the plurality of conduits converging to form an annular exit, the top portion including a plurality of radially-expanding channels acoustically connected to the annular exit, wherein actuation of the diaphragm by the motor assembly generates sound waves within the compression chamber which travel through the annular exit and the radially-expanding channels, wherein the lower and the upper horn members are coupled via the compression driver in spaced relationship along the central axis to define a passageway for radiating sound waves generated by the compression driver in a generally horizontal 360° radiation pattern.

15. The omnidirectional loudspeaker of claim 14, wherein the top portion has a generally constant height above the bottom portion.

16. The omnidirectional loudspeaker of claim 14, wherein at least one of the lower or the upper horn members includes a recess for at least partially receiving the compression driver.

17. The omnidirectional loudspeaker of claim 14, wherein the lower horn member includes generally concave, downwardly-facing inner wall defining a lower cavity, and wherein the upper horn member includes a generally concave, upwardly-facing inner wall defining an upper cavity.

18. The omnidirectional loudspeaker of claim 14, wherein the radially-expanding channels have an expanding width in a horizontal plane from the annular exit to a perimeter of the compression driver.

* * * * *